United States Patent

Comber

[15] 3,697,945
[45] Oct. 10, 1972

[54] LOCK SWITCH AND SECURITY SYSTEM FOR MOTOR VEHICLE ELECTRICAL CIRCUITS

[72] Inventor: James D. Comber, 2335 South Overlook Drive, Cleveland Heights, Ohio 44106

[22] Filed: Jan. 20, 1971

[21] Appl. No.: 107,987

[52] U.S. Cl. ............... 340/64, 180/114, 307/10 AT
[51] Int. Cl. ............................................ B60r 25/04
[58] Field of Search ............... 340/64, 63; 180/114; 307/10 AT; 200/45, 172 R

[56] References Cited

UNITED STATES PATENTS

| | | | |
|---|---|---|---|
| 3,596,243 | 7/1971 | Leibholz | 340/64 |
| 3,624,602 | 11/1971 | Le Doux | 307/10 AT |
| 2,583,752 | 1/1952 | Smith | 340/64 |
| 2,082,091 | 6/1937 | Adams, Jr. | 200/172 R |
| 3,453,591 | 7/1969 | Perez | 340/64 |
| 2,620,387 | 12/1952 | Eberhardt | 340/64 |
| 3,251,204 | 5/1966 | Siegel | 307/10 AT |
| 2,517,619 | 8/1950 | Ainley | 340/63 |

Primary Examiner—John W. Caldwell
Assistant Examiner—Glen R. Swann, III
Attorney—John W. Renner and Joseph B. Balazs

[57] ABSTRACT

A combination type lock switch and security system for a motor vehicle electrical circuit such as the primary ignition circuit. The system utilizes a plurality of switch units mounted in a sealed casing and having control elements that may be adjusted to different positions relative to a control panel on one face of the casing. The movable contact of each switch unit has one circuit "unlocking" or enabling position and in all other positions it grounds or "locks" the circuit by engaging a grounded stationary contact. The system also contemplates the use of a tamper proof conductor between the lock switch casing and another circuit component such as a distributor for the vehicle motor.

7 Claims, 8 Drawing Figures

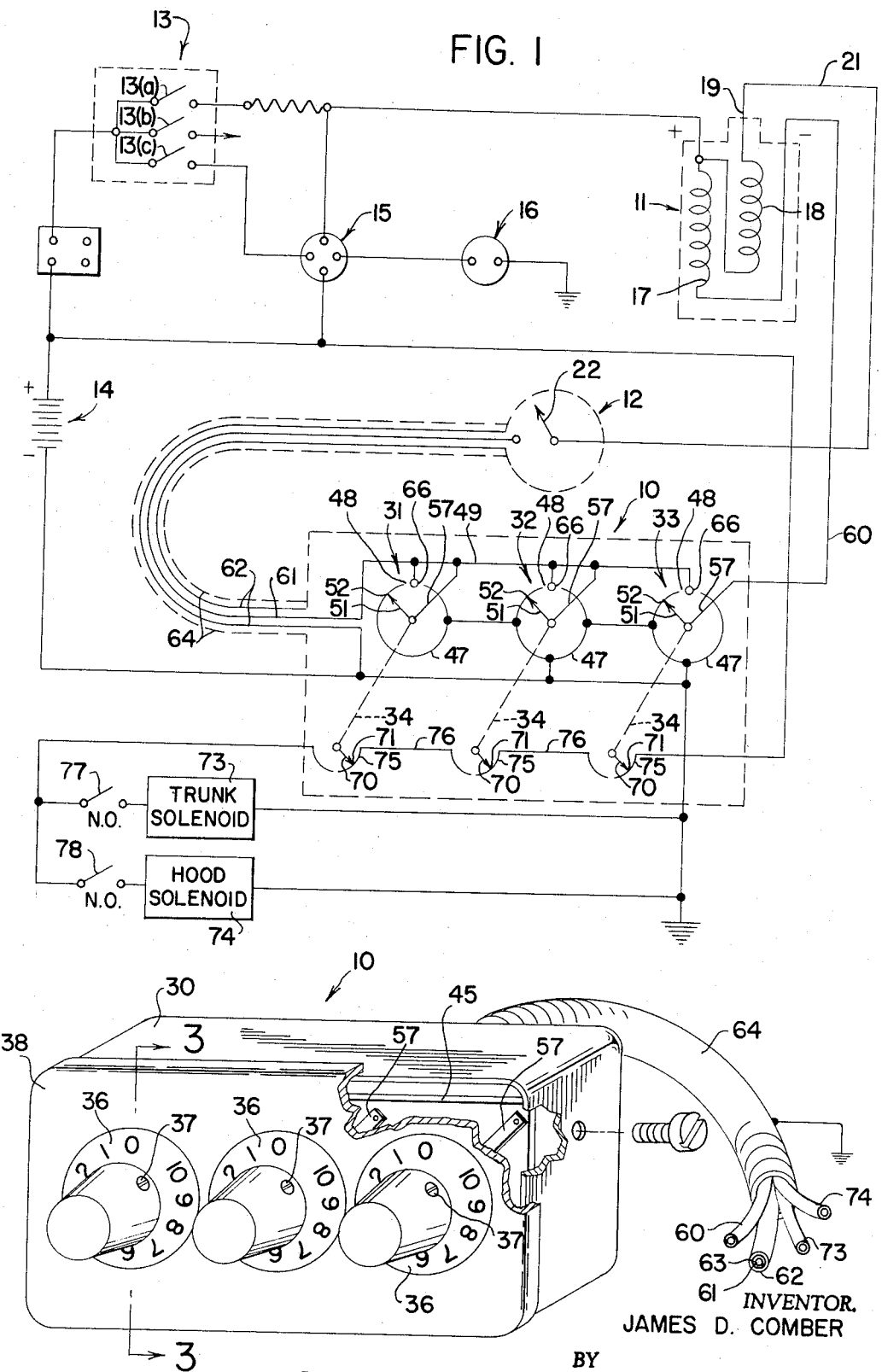

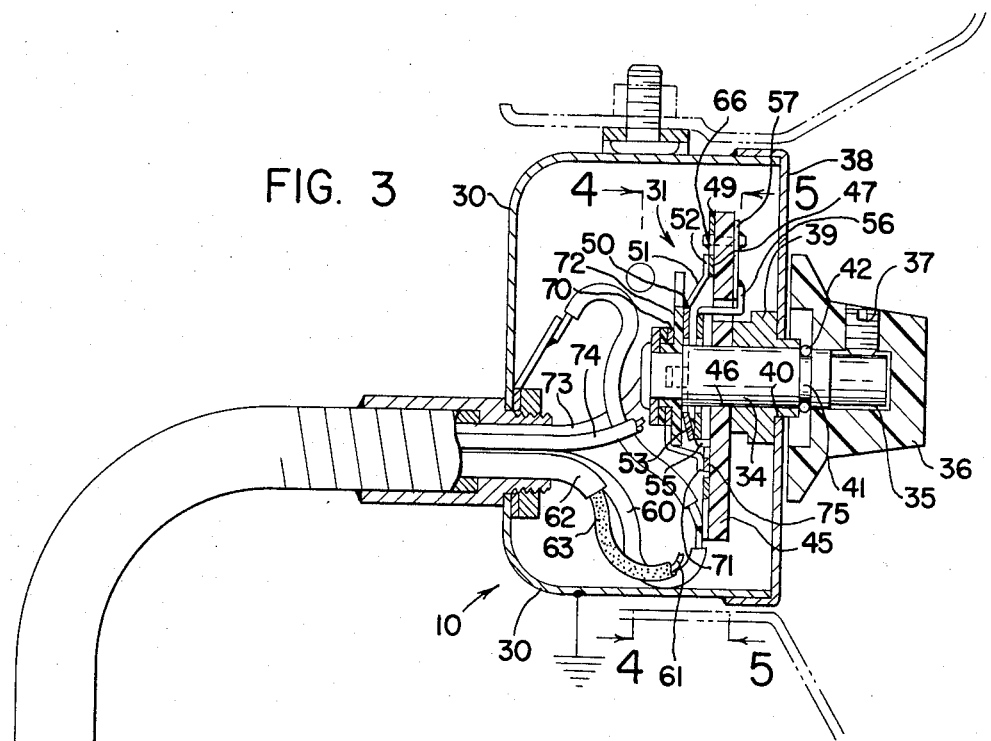
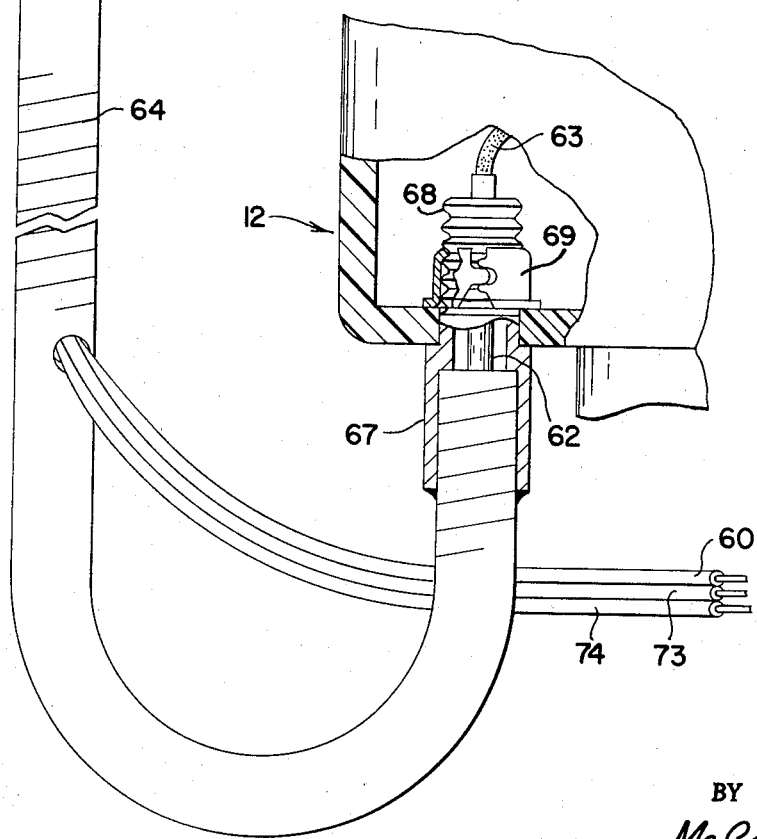
FIG. 3

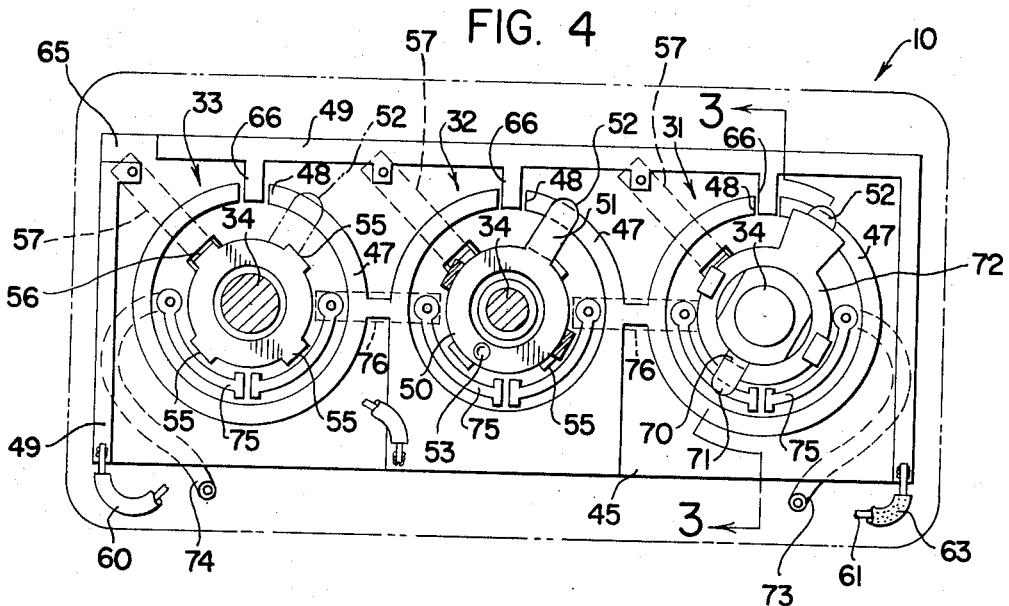

3,697,945

LOCK SWITCH AND SECURITY SYSTEM FOR MOTOR VEHICLE ELECTRICAL CIRCUITS

BACKGROUND OF THE INVENTION

This invention relates to anti-theft systems for motor vehicles and especially to systems for disabling a motor vehicle by securing an essential electrical circuit such as the primary ignition circuit, against unauthorized activation. More particularly the invention relates to an improved combination type lock switch for the primary ignition circuit and associated security devices which aid in defeating attempts to "jump" the ignition circuit or bypass the key operated lock switch by connecting a separate jumper lead to its input and output terminals respectively.

Combination type lock switch systems have been used in various electrical circuits of motor vehicles to guard against theft and in some instances as an alternative to the ignition key lock switch. Systems of this type are disclosed in U.S. Pat. Nos. 2,806,911 to Harty and Dux and 3,214,531 to Dux. These systems utilize a plurality of rotary-type switches in the primary ignition circuit of the vehicle. Each switch has a plurality of positions to which it may be moved or turned but in only one of the positions will it close switch contacts to complete the ignition circuit. Thus the primary ignition circuit will be open or inoperative unless each rotary switch is set to its correct circuit closing position. If any one of the rotary switches is in a circuit interrupting or "locking" position, the circuit will be inoperative and cannot be energized.

Some of these prior art automobile security systems also use as a secondary precaution, an alarm circuit which will be actuated when one or more switches of the combination are set to a "locked" position and when some other condition exists such as the opening of the car door.

One major weakness of automobile security systems in the prior art is that they may be defeated or avoided by bypassing the switch such as by connecting a separate lead between the input and output terminals of the lock switch unit or "jumping" the ignition circuit between the coil and the distributor. The present invention however, avoids the difficulties of the prior art and affords other features and advantages heretofore not obtainable.

SUMMARY OF THE INVENTION

It is among the objects of the invention to protect a security system in the ignition circuit of an automotive vehicle against tampering.

Another object is to provide a combination type lock switch for the primary ignition circuit of a motor vehicle, that may not be rendered ineffective or inoperative by connecting a bypass lead between the input and output terminals of the switch.

Still another object is to provide a security system for the primary ignition circuit, that makes it difficult if not impossible for a thief to jump the ignition circuit by connecting a separate lead between the coil and the distributor.

Still another object is to provide a novel ignition system locking device of relatively low cost construction, that may be readily installed on the instrument panel of a variety of different types of motor vehicles.

These and other objects are accomplished by means of a lock switch system utilizing a combination lock switch with a sealed casing and a front panel with appropriate indicia marked thereon. A plurality of switching units are mounted in the casing, each with a control element on the control panel and its switch contacts within the casing. Each unit has a movable contact operable by the control element and each movable contact has a circuit enabling position and one or more circuit disabling or "locking" positions. The control element may be positioned relative to the movable contact in a plurality of different operating positions so that its position relative to the movable contact may be changed as desired to change the "combination" of the system. At least one of the switch units has a grounded contact that is engageable with the movable contact whenever the movable contact is not in its circuit enabling position so that the respective electrical circuit is grounded when the respective movable contact is in its "locking" position.

The lock switch system is preferably located in the primary ignition circuit of the motor vehicle and is advantageously connected between the primary windings of the ignition coil and the make-or-break contact of the distributor.

As another aspect of the invention the electrical conductor between the lock switch casing and the distributor is encased by a grounded coaxial tubular conductor insulated from the circuit conductor by relatively thin displaceable material so that if the circuit conductor and grounded conductor are cut the grounded conductor will be squeezed into contact with the circuit conductor to disable the primary ignition circuit.

According to still another aspect of the invention the electrical conductor between the lock switch casing and the vehicle distributor extend through an armored tubular conduit which is securely and permanently connected to the distributor housing and the lock switch casing in a manner that does not permit mechanical disconnection without physical breaking of the conduit.

BRIEF DESCRIPTION OF THE DRAWINGS

FIG. 1 is a schematic diagram of motor vehicle electrical circuits including a combination type electrical lock switch and security system embodying the invention;

FIG. 2 is a perspective view of the combination electrical lock switch unit illustrated schematically in FIG. 1 with parts broke away for the purpose of illustration;

FIG. 3 is a vertical section on an enlarged scale taken on the line 3—3 of FIG. 2 and including a fragmentary sectional view of a portion of the vehicle distributor;

FIG. 4 is a sectional view through the combination electrical lock switch unit taken on the line 4—4 of FIG. 3;

FIG. 5 is a sectional view on an enlarged scale taken on the line 5—5 of FIG. 3;

FIG. 6 is a sectional view taken on the line 6—6 of FIG. 5 and illustrating the electrical circuit conductor between the lock switch unit and the vehicle distributor and the grounded coaxial tubular conductor surrounding the circuit conductor;

FIG. 7 is a sectional view similar to FIG. 6 and illustrating the condition that results when an attempt is made to cut through the electrical cable; and

DESCRIPTION OF THE PREFERRED EMBODIMENT

Referring more particularly to the drawings, FIG. 1 shows certain electrical circuits for a motor vehicle including an ignition circuit having a combination type lock switch unit 10 interposed between the coil 11 and the distributor 12. The various circuits are activated by a key operated ignition lock switch 13 connected in series between the battery 14 and the various other circuits. The switch 13 has three movable contacts 13(a), 13(b) and 13(c) one of which, 13(c), energizes a starter circuit including a starter solenoid 15 and the starter 16. Another movable contact 13(b) energizes certain accessory circuits such as for example a radio, heater blower, etc. Another movable contact 13(a) energizes the ignition circuit including the coil 11 and distributor 12. The circuit extends through the primary coil 17 and from the negative terminal of the primary coil 17 to the lock switch 10. The secondary coil 18 has a central terminal 19 with a high tension lead 21 connecting the terminal 19 to the rotor 22 of the distributor 12.

The combination type lock switch unit 10 is best illustrated in FIGS. 2, through 5. The unit has a casing 30 that contains three rotary switch units 31, 32 and 33. Each unit has a switch shaft 34 with a knurled front end 35 that receives a dial knob 36 secured to the front end 35 by a set screw 37. The front end 35 of each shaft 34 extends through a control panel 38 on the front end of the casing 30 and each dial knob 36 has indicia thereon that may be used with related indicia marked on the control panel 38.

Each of the shafts 34 is journaled in a bushing 39 that is pressed into a circular opening 40 in the control panel 38. The forward end 35 of each shaft 34 has an annular groove 41 that receives a lock ring 42 that bears against the forward end of the bushing 39. This aids in securing the shafts 34 in a proper axial position in the bushings 39.

Located within the lock switch casing 30 is a printed circuit board 45. The board 45 has three openings 46 positioned and aligned to received the switch shafts 34 of the respective switch units 31, 32 and 33. Concentric with each of the holes 46 on the rearward face of the board 45 (FIG. 4) is a grounded circular contact print 47 with a discontinuous portion 48 that defines a circuit enabling position for the shaft 34 to be defined more specifically below. Also imprinted on the circuit board as illustrated in FIG. 4 is an ignition circuit closing conductor pattern 49. Each switch shaft 34 carries a rotary contact carrier 50 with an arm 51 containing a contact 52 and each contact carrier 50 is electrically connected to the ignition circuit closing conductor pattern 49.

The contact carrier 50 has a raised dimple 53 (FIG. 8) that engages a stationary contact disc 54 attached to the circuit board 45. The disc has three spacer lugs 55 that bear against the circuit board 45 and space the disc 54 away from the board. The disc also has a larger contact lug 56 that extends through a hole in the circuit board 45 and contacts one end of a conductor print 57 on the forward face of the board 45 (FIG. 5). The conductor prints 57 are connected at their other ends through the board to the ignition circuit pattern 49 on the rearward face of the board. Thus the contact arms 51 are all connected to the ignition circuit pattern.

Accordingly, whenever the contact 52 of one of the rotary switch units 31, 32, or 33 is in contact with the respective grounded contact ring 47 the ignition circuit portion between the coil 11 and the distributor 12 will be grounded. Each of the rotary switch units 31, 32, and 33 has only one position in which its respective rotary contact carrier 50 does not place its contact 52 in contact with the respective grounded contact ring 47. This particular position of the shaft 34 may be set by turning the dial knobs 36 on each of the switch units to the correct position to "unlock" or enable the ignition circuit.

It will be noted that the dial knobs 36 may be set to any number of positions relative to the position of their respective rotary contact carrier 50 so that different angular positions of each dial knob 36 may be provided in each of their respective unlocking or circuit enabling positions. These positions may be changed by loosening the respective set screw 37 and repositioning the dial knob 36 on the front end 35 of the respective shaft 34, however, this should always be done when the switch is in its enabling position so that the new unlocking position of the dial knob can be determined by the operator.

A conductor 60 (FIG. 1) from the primary ignition coil 17 and a conductor 61 from the distributor 12 are connected to the ignition circuit conductor print 49 on the printed circuit board 45 (FIG. 4).

The ignition circuit conductor print 49 may or may not be continuous between the conductors 61 and 60, and in the embodiment shown it has one break at 65 as seen in FIG. 4 so that the circuit must be completed through the print 57, contact ring 54, and contact carrier 50 of the switch unit 33. The other switch units merely serve to ground the ignition circuit and are not necessary for the purpose of completing the circuit. Never-the-less, contact tabs 66 are provided in the spacer 48 for each switch unit 31, 32 and 33, and are engaged by the respective contacts 52 when the units are in the "unlocking" or enabling positions.

Referring to FIG. 1 it will be seen that each switch shaft 34 has a second contact carrier 70 with a contact arm 71, the carriers 70 being separated from the contact carriers 50 by insulators 72. The arm 71 completes two other circuits of the motor vehicle when the shaft 34 is turned to the "unlocking" position. These circuits in the embodiment shown are connected to the solenoid 73 of a solenoid lock for the trunk on the one hand and to a solenoid 74 of a solenoid lock for the hood on the other hand. The solenoids 73 and 74 are energized only when each of the contact arms 71 is in a position corresponding to the enabling position of the respective rotary contact carrier 50. In this position the contact arms 71 on the contact carriers 70 contact both the two spaced contact portions of one of three conductor prints 75 in the circuit and thus complete the circuit, at least that portion for the respective rotary switch of the combination lock switch unit 10.

The solenoids 73 and 74 operate a plunger that is operatively connected to a latch mechanism which when extended secures the trunk lid or hood respectively in a down and locked position. The solenoids must be energized in order to retract the plunger and release the latch and they can be energized only when the rotary switch units are in the enabling position. Each of the solenoids 73 and 74 also has a normally open manually operated switch 77 and 78 in the passenger compartment of the car, which switches serve to complete the circuit through the respective solenoids assuming that the dial knobs 36 are turned to the proper enabling position.

The conductor 61 that connects the combination lock switch unit 10 to the distributor 12 is protected against attempts to cut it out of the circuit or to otherwise defeat the purpose of the security system. Particularly the conductor 61 serves to abort any attempt by a thief to jump the terminals of the primary ignition coil 17 and the distributor 12.

In order to achieve these results the conductor 61 extends through a tubular grounded coaxial conductor 62 that is spaced from the circuit conductor 61 by a spacer sleeve 63 formed of insulating material. The spacer sleeve is formed of thin easily displaceable material and may not necessarily be continuous. For example, it may be a loosely woven fabric. Its principal purpose is to insulate the grounded tubular conductor 62 from the circuit conductor 61 but to be sufficiently displaceable that any attempt to cut through the outer tubular grounded conductor 62 will result in the metal of the conductor 62 which is relatively soft such as a soft copper, being squeezed through the insulation 63 and into contact with the circuit conductor 61 so that the conductor 61 will be grounded on both sides of the resulting cut (FIG. 7).

The tubular grounded conductor 62 is preferably connected to ground at both ends i.e., at the end which extends to the lock switch unit 10 and at the end which extends to the distributor 12. Both the conductor 61 and tubular grounded coaxial conductor 62 extend through a flexible armored conduit 64 that affords further protection against tampering. The conduit 64 is of conventional commercial construction and may be formed for example of helical interlocking metal strips. In order to prevent disconnection of the circuit from the distributor 12 a snap lock type connection is used as illustrated in FIG. 3.

The connector 67 has an enlarged outer body that receives and grips the conduit 64 and that has an external shoulder that bears against the distributor casing. One end of the connector extends through the distributor wall and has annular grooves 68 that cooperate with an expansible lock ring 69. During assembly the connector 67 and lock ring 69 are inserted through the hole in the distributor wall and the ring expands to lock the connector in position so that it cannot be easily disconnected.

While the invention has been shown and described with rereference to a specific embodiment thereof, this is for the purpose of illustration rather than limitation and other variations and modifications will be apparent to those skilled in the art upon a reading of the specification and claims. Wherefore the patent is not to be limited in scope and effect to the specific embodiment shown and described nor in any way that is inconsistent with the extend to which the progress in the art has been advanced by the invention.

I claim:
1. A lock switch system for a motor vehicle electrical circuit comprising a switch casing with a control panel, a plurality of switching units, each unit being mounted in said casing, at least one of said units having a control element on said control panel and switch contacts within said casing, said contacts including a movable contact operable by said control element and having a circuit enabling position and a plurality of circuit disabling positions, a grounded contact engageable with said movable contact whenever said movable contact is not in its circuit enabling position whereby said electrical circuit is grounded when any one or more of said movable contacts is in contact with its respective grounded contact.

2. A lock switch system as set forth in claim 1 further including a portion of said electrical circuit included in said switch casing, said movable contacts being electrically connected to said portion of said electrical circuit for grounding same when said movable contacts are in other positions than said circuit enabling position.

3. A lock switch system as set forth in claim 2 wherein said portion of said electrical circuit is discontinuous and at least one of said switching units is adapted for electrical completion of said portion when in the circuit enabling position.

4. A lock switch system as set forth in claim 3 wherein said portion of said electrical circuit and said grounded contact comprise a printed circuit board conductive pattern, said movable contacts of said switching units being adapted for sliding engagement with said conductive pattern.

5. A lock switch system for a motor vehicle electrical circuit comprising a switch casing with a face plate, a plurality of rotary switch units, each unit including a shaft mounted for free rotation in said casing and having an end portion extending through said face plate, a dial knob adapted for connection to said end portion, means for securing said dial knob to said end portion for angular adjustment to a plurality of operating positions relative to said shaft, a movable contact carried by said shaft within said casing said contact being electrically connected to said circuit, stationary contact means within said casing cooperable with said movable contact, said contact means including a grounded contact engageable with said movable contact at a plurality of angular positions of said shaft, whereby said electrical circuit is grounded when any one or more of said shafts is positioned with its respective movable contact in contact with said respective grounded contact.

6. A lock switch system as defined in claim 5 further including a circuit conductor between said lock switch casing and the distributor of the motor vehicle, said circuit conductor being surrounded by a grounded coaxial tubular conductor insulated from said circuit conductor by relatively thin displaceable material whereby if said circuit conductor and grounded tubular conductor are cut said grounded conductor will be squeezed into electrical contact with said circuit conductor.

7. A lock switch mechanism as defined in claim 6 wherein the electrical conductors are located within flexible metal tubular conduit.

* * * * *